United States Patent Office 2,886,541
Patented May 12, 1959

2,886,541

METHOD OF PREPARING AN ADHESIVE WHICH COMPRISES REACTING AN AMYLACEOUS MATERIAL, A PHENOL AND AN ALDEHYDE

David P. Langlois and George C. Pinney, Decatur, Ill., assignors to A. E. Staley Manufacturing Company, Decatur, Ill., a corporation of Delaware No Drawing. Application June 8, 1955
Serial No. 514,100

6 Claims. (Cl. 260—17.2)

This invention relates, generally, to improvements and innovations in starch and/or dextrin base adhesives in which a phenolic compound and an aldehyde are copolymerized with starch and/or dextrin so as to produce alkaline setting adhesives which on drying after application form water-resistant or water-proof bonds. The adhesives prepared in accordance with this invention are particularly suitable for use in the manufacture of laminated and corrugated paperboard, the two principal commercial types of paperboard.

Starch and/or dextrin base adhesives have been long and extensively used in the manufacture of laminated and corrugated paperboard products. Such adhesives have also been used for other laminating purposes. While starch and/or dextrin alone may be used as the basis of laminating adhesives, as disclosed, for example, in Bauer Patents Nos. 2,051,025 and 2,102,937, the adhesive bonds formed therefrom are deficient in one important respect, i.e. the adhesive bonds so formed are not waterproof and do not have adequate water resistance for a number of purposes. The hydrophilic groups in the starch molecule which make it easily dispersible in water and therefore conveniently useful in the preparation of aqueous starch base adhesives, also make the adhesive bonds formed on drying susceptible to weakening and separation in the presence of water.

This deficiency of starch and/or dextrin base adhesives (which are broadly referred to as amylaceous adhesives) has long been recognized and substantial efforts have been made to remedy this defect. As a result of these efforts, several acid-setting starch resin adhesives have been developed and offered to the trade which exhibit adequate water resistance. For example, urea formaldehyde and melamine formaldehyde resins have been used as described in Patent No. 2,463,148. However, these acid-setting starch resin adhesives are not, and have not proved to be, wholly satisfactory primarily because when they are used the rate of operation of the laminating or corrugating board machinery has to be reduced substantially below the normal rate used when straight starch base adhesives are employed. There are other objections, an important one being the fact that corrosion problems are introduced when an acid-setting adhesive is used. In addition, the conventional amylaceous adhesives are used under alkaline conditions and therefore when a laminating or corrugating machine is changed over from one type (i.e. alkaline or acid) of adhesive to the other, it is necessary in each instance to thoroughly clean and wash the machine at a substantial labor cost.

Since the acid-setting starch base adhesives have not proven completely satisfactory, continued efforts have been made to produce an alkaline setting amylaceous adhesive that will set to an adhesive bond, will be water-resistant or waterproof and will not be subject to the serious objection of low-speed operation, or otherwise objectionable. One proposal for producing such an alkaline setting amylaceous adhesive is disclosed in Patent No. 2,626,934 wherein a preformed water soluble, alkaline setting resin, e.g., resorcinol aldehyde, is combined with starch. Alkaline setting amylaceous adhesives of the type disclosed in this patent have not, to our knowledge, gained acceptance commercially which tends to confirm our finding that when prepared in accordance with the disclosure of that patent the resulting adhesives do not adequately exhibit the properties and advantages alleged in the patent.

It has been discovered in accordance with the present invention that alkaline setting amylaceous adhesives having excellent properties including water-resistant or water-proof bonds as required and adequate pot life may be prepared providing that phenolic compounds and aldehyde compounds are copolymerized with starch in certain specific proportions and under certain specific conditions. The resulting adhesives may be applied at normal speeds in regular laminating or corrugating board machinery without the necessity of thorough cleaning or washing either before or after a conventional starch base adhesive is used. Certain premixes of ingredients and techniques for simplifying and facilitating the preparation of the adhesives have also been discovered and will be referred to hereinafter.

Accordingly, the object of the invention, generally stated, is the provision of alkaline setting amylaceous adhesives which may be conveniently and economically prepared and used on conventional laminating or corrugating machinery, operating at normal speeds, to form adhesive bonds ranging from water-resistant to waterproof, depending upon the particular formulations and requirements.

More particularly, an object of this invention is the provision of alkaline setting amylaceous adhesives, and premixes for preparation thereof, which may be conveniently prepared from starch and/or dexterin and certain phenolic and aldehyde compounds copolymerizable therewith, the adhesives being characterized by (1) the formation of water-resistant or waterproof adhesive bonds on drying, depending upon the particular formulations and requirements, (2) adequate pot life and (3) interchangeability with conventional starch base adhesives without thorough machine cleaning and washing.

Another object of the invention is the provision and use of an alkaline setting amylaceous adhesive containing unpasted starch or other diluent for and in the production of waterproof solid laminated paperboard on conventional laminating machines having unheated rolls and operating at normal speeds.

Still another object of the invention is an improved method of preparing starch base adhesives capable of forming waterproof bonds wherein all of the starch is partially swelled (e.g. by use of caustic soda) to a predetermined viscosity without being completely gelatinized, a phenolic compound (e.g. resorcinol) is added to stop further gelling, and thereafter an aldehyde is added and the mixture allowed to ripen into condition for use either as a solid board laminating adhesive or as a corrugated board adhesive.

Certain other objects of the invention will, in part, be obvious and will, in part, appear hereinafter.

For a more complete understanding of the nature and scope of the invention, reference may now be had to the following detailed description thereof in which a number of specific examples are set forth as illustrative of the nature and scope of the invention and also to acquaint those skilled in the art with the best manner of practicing the same.

Mention has been made above of two types of paperboard, i.e. corrugated board and solid laminated board. As the names of these products imply, corrugated board consists of a strip of corrugated paper having a flat sheet of paper adhered to one or both sides, whereas solid laminated board consists of a number of plies of paper laminated together. In general, corrugated board is laminated with starch adhesive containing unpasted starch (i.e. potential starch adhesive) suspended in pasted starch referred to in the art as carrier starch. The glued board is passed over hot rolls and the heat therefrom pastes the unpasted starch and the starch adhesive is formed in situ and dried. In the production of solid laminated board, the starch laminating adhesive conventionally does not contain unpasted starch and the board is made without heated rolls. The starch adhesive used for solid board laminating is a heavier bodied paste than that used for corrugating work and is generally made by using dextrins in concentrations of about 25%.

The basic reaction which takes place in practicing the present invention occurs in an aqueous medium and involves the polymerization of (1) gelatinized or pasted starch and/or dextrin, (2) at least one phenolic compound of the class hereinafter described, and (3) at least one aldehyde compound of the class hereinafter described. In order to obtain the desired results, it is necessary that the aldehyde be present in a concentration substantially in excess of the stoichiometric amount required to react with the phenolic compound. In other words, the mol ratio of aldehyde to phenolic compound must be substantially in excess of 1 and preferably in the order of 2 to 1. The reaction is carried out at an alkaline pH of at least 8.5, and preferably 10 to 11, which may readily be obtained by the use of sodium hydroxide as an alkaline catalyst. The time and temperature factor of the copolymerization reaction are so controlled that the paste has adequae pot life, i.e. does not gel or lose its adhesive character prematurely. However, the rate of the polymerization reaction must be fast enough so that the resulting adhesive composition when dried forms an adhesive bond which ranges from water-resistant to waterproof, according to requirements.

Investigation has revealed that the reaction product obtained on polymerizing the three ingredients in the foregoing manner is distinctly different from the product that was obtained by first reacting the phenolic compound with the aldehyde compound to form a resin and then reacting the resin with the amylaceous material.

As to the three basic reactants that may be used (i.e. starch or dextrin, phenolic compound and aldehyde, in general any commercial kind of starch or dextrin may be used. That is, all starches and dextrins may be employed which contain sufficient available hydroxyl groups so that a copolymerization reaction can occur between them and the other two reactants. The kind of starch or dextrin used for a particular adhesive will depend upon the nature and type of the adhesive desired. For example, if a low solids content adhesive is desired, a thick boiling starch can be used. On the other hand, if a high solids content product is desired, dextrins can be used. Various mixtures of different types of starch and/or dextrin can be formulated by those skilled in the art to meet specific properties and requirements. Since dextrins and thin-boiling starches are more completely dispersed in water and hence much more reactive during the polymerization step, greater control must be exercised with respect to these materials to prevent too complete or too rapid reaction. Otherwise, the adhesive may not have adequate pot life or adequate adhesive character.

The starch or dextrin concentration in any particular adhesive formulation depends upon the specific formulation involved and the type of starch or dextrin used. For example, if a thick-boiling native starch is used and all of the starch present is pasted, a maximum of about 10% thereof is all that can be used. However, if some unpasted starch is added, as is the common practice in preparing corrugating adhesive, starch concentrations of 20% or more are possible. Dextrins may be used in concentrations up to about 25%. For any given starch or dextrin, other conditions being the same, increases in the concentration of the starch and/or dextrin increases the reactivity of the copolymerization.

Insofar as the phenolic compounds useful in the invention are concerned, they include phenol, hydroquinone, resorcinol, pyrocatechol, pyrogallol and bisphenol.

Referring to aldehydes which are useful, formaldehyde, glyoxal, acetaldehyde, propionaldehyde and furfural may be used. Preferred results have been obtained with resorcinol and formaldehyde although resorcinol-furfural, resorcinol-furfural-formaldehyde, resorcinol-glyoxal, and resorcinol-glyoxal-formaldehyde combinations have all given excellent results.

As would be expected, the greater the amount of the phenolic and aldehyde reagents that are used, the greater will be the water resistance. Conversely, the greater the percentage of starch and/or dextrin used, the lower will be the water resistance of the adhesive. If too great a percentage of starch is used, the water resistance will be too low, whereas if too great a percentage of the other reactants is used, the adhesive will have a high degree of insolubility and an adhesive value which is too low. Therefore, it is necessary to formulate within the limits disclosed. In this connection it has been found that the phenolic compound may be used in a range of from 2.5 to 20% by weight of the starch and/or dextrin with optimum results being obtained with from 5 to 7.5% by weight.

With respect to the aldehyde concentration, it is more convenient and preferable to state this in the form of a ratio to the phenolic compound concentration. Thus, it has been found that a mol ratio of aldehyde to resorcinol of greater than 1 to 1 is always required. Preferably, the aldehyde to phenolic compound ratio (i.e. A/P) is approximately 2 to 1. In certain instances the mol ratio may be as low as 1.3 to 1. For example, with an adhesive made in accordance with the present invention and containing 5% resorcinol based on the weight of starch, good water resistance can be obtained if the aldehyde-phenolic ratio is 2 to 1. A lower ratio than this will give little water resistance. On the other hand, if 7.5% resorcinol based on the weight of starch is used, an aldehyde-phenolic ratio of 2 to 1 will result in a completely waterproof adhesive, while an adhesive of only fair water resistance will be obtained with an aldehyde to phenolic ratio of 1.3 to 1. Higher aldehyde to phenolic ratios tend to shorten the pot life of the adhesives and therefore this factor must be taken into consideration in preparing a particular formulation.

One effective technique for controlling the rate and degree of copolymerization in certain embodiments of the invention is to control the temperature used in pasting the starch component. This in turn controls the degree of dispersion of the starch or dextrin and therefore the availability of the hydroxly groups for reaction with the other two components. Starch cooked at 212° F. or higher is therefore much more reactive than starch cooked at lower temperatures. Alkalinity also has a bearing on the degree of pasting of the starch or dextrin since, in general, increases in alkalinity tend to decrease the pasting temperature.

One preferred procedure for practicing the invention is to mix the starch and/or dextrin and the phenolic compound in water with sufficient alkali to give a slurry having a pH of about 10 to 10.5. Such a slurry mixture is heated to 145–165° F. at which temperatures sufficient swelling of the starch occurs to give the desired viscosity to the paste. Complete dispersion of the starch does not occur and is not desired at this time. The temperature of the pasted starch mixture is then lowered to about 100–115° F. and the aldehyde constituent added. Within about ½ to 1 hour and adhesive composition will be obtained which, when used either for production of solid paperboard or corrugated board, will give a waterproof bond on drying. The reaction in the adhesive composition continues beyond the ½ to 1 hour period and the viscosity of the adhesive slowly increases as further reaction takes place between the three constituents. The working life (i.e. pot life) will usually be from 8 to 48 hours depending upon conditions used, such as the amount of phenolic compound, the A/P ratio, concentration of the starch, kind of starch or dextrin, and the alkalinity. In the event an adhesive formulation prepared according to the invention happens to have a shorter working life than desired, a simple treatment of the adhesive will usually correct the difficulty. Thus, if the viscosity of the paste increases to the point of becoming unworkable, small amounts of water may be added to reduce the viscosity to a workable level without adversely affecting the adhesive properties. This treatment can be used effectively up to the point at which the starch-phenolic-aldehyde copolymer loses its adhesive character.

The following group of examples discloses a number of practical embodiments of the invention which serves to illustrate the invention and suggest other similar embodiments to those skilled in the art.

*Example 1*

A mixture of 60 parts of a white dextrin of medium viscosity and low solubility and 6 parts of resorcinol was slurried in 160 parts of water and 1.7 parts of a 25% sodium hydroxide solution was added to give a pH of 8.5. This slurry mixture was heated at 185–212° F. for 10 minutes and then cooled to 100–115° F. Three parts of paraformaldehyde in 20 parts of water was added, and the temperature was maintained in the range of 100–115° F. Within ½ to 1 hour's time the adhesive was found ready for use in the production of solid board laminations. After application, this adhesive upon drying without further heating gave a waterproof bond.

*Example 2*

A dry mixture of 60 parts of Pearl starch and 12 parts of resorcinol was slurried in 650 parts of water. Ten parts of a 25% sodium hydroxide solution was added to give a pH of 10. The slurry mixture was heated to 145–160° F. and maintained in that temperature range for 10 minutes so as to paste the starch. It was then cooled to 100–115° F. and 6.5 parts of paraformaldehyde was added. The temperature was maintained in the 100–115° F. range and within ½ to 1 hour's time the adhesive was ready for use for solid board lamination work. Upon drying, after application in the usual manner, the adhesive gave a waterproof bond.

*Example 3*

A mixture of 100 parts of Pearl starch and 45 parts of resorcinol was slurried in 600 parts of water. Thirty-five parts of a 25% solution of sodium hydroxide was added to give a pH of 10. The slurry mixture was heated to 145–160° F. and a temperature in this range was maintained for about 10 minutes during which the starch was pasted. Approximately 400 parts of water was then added to the heated slurry mixture and the pasted starch mixture was then slowly mixed into a slurry of 500 parts of Pearl starch plus 25 parts of paraformaldehyde in 1045 parts of water. The temperature of the resulting mixture was adjusted to 100–115° F. and within ½ to 1 hour the resulting adhesive was ready for use either in the production of corrugated board or for solid board lamination work. When this adhesive is used in the production of either product it gives a waterproof bond.

*Example 4*

A mixture of 100 parts of Pearl starch and 30 parts of resorcinol was slurried in 600 parts of water. Twenty-four parts of a 25% solution of sodium hydroxide was added to the slurry mixture to give a pH of 10. The alkaline mixture was heated to 145–160° F. and that temperature maintained for 10 minutes so as to paste the starch. Four hundred parts of cold water was added and the pasted starch mixture was then slowly mixed into a slurry of 500 parts of Pearl starch plus 12 parts of paraformaldehyde in 1045 parts of water. The temperature of the resulting mixture was adjusted to and held at 100–115° F. and within ½ to 1 hour the adhesive was ready for use for the production of either corrugated board or solid board laminations. This adhesive is capable of forming waterproof bonds when used for producing either of these products.

*Example 5*

A mixture of 100 parts of pregelatinized starch, 500 parts of Pearl starch and 45 parts of resorcinol was slurried with 2045 parts of water at 100–115° F. containing 9 parts of caustic soda. Twenty-five parts of paraformaldehyde was added to the slurry mixture and the temperature raised to and maintained at 100–115° F. After ½ to 1 hour's time an adhesive composition was obtained which was ready for use in a corrugating board machine to yield a waterproof bond.

When the adhesive compositions prepared in accordance with Examples 3 and 4 containing unpasted starch are used to produce corrugated board, the hot rolls paste the unpasted starch in the usual manner and firm bonds are produced. However, as stated, these same formulations are also useful in cold laminating applications wherein the laminating rolls are not heated. Surprisingly, the presence of unpasted starch in the adhesive formulations of Examples 3 and 4 results in more effective waterproofing than if it is omitted. This type of preparation has importance since, while only a very limited amount of pasted starch can be used due to its high viscosity, a much larger amount of unpasted starch may be used without appreciably increasing the viscosity of the mixture. It has been found that even when the starch solubles in this type of adhesive preparation are built up by incorporation of dextrins or thin-boiling starches, it is still possible to improve the waterproofness of the resulting adhesives by adding unpasted starch. As indicated, the beneficial effect of the unpasted starch is surprising since it would normally be expected that unpasted starch would act merely as a diluent and therefore weaken the adhesive bond. It is thought that the unpasted starch may act as though it were loose cellulose fibers which become embedded in the paper surface during the pasting and drying of the adhesive bond. This may give an effect akin to several layers of laminated cellulose material each bonded with a thin film of waterproof adhesive.

When used as cold laminating adhesive preparations, the unpasted starch in the formulations of Examples 3 and 4 may be in whole or in part replaced with other materials such as wood, flour, corn hulls, soybean hulls and ground corncobs. The resulting starch adhesives may be used as a laminating base to give completely waterproof bonds. The following example illustrates such a formulation in which unpasted starch has been entirely replaced with a diluent, i.e. corn bran:

*Example 6*

A mixture of 60 parts of Pearl starch and 12 parts of resorcinol was slurried in 400 parts of water. Ten parts of a 25% sodium hydroxide solution was added to give a pH of 10. The slurry mixture was heated to 145–160° F. and maintained in that temperature range for 10 minutes so as to paste the starch. This mixture was slowly stirred into a slurry of 100 parts of corn bran and 7.5 parts of paraformaldehyde in 730 parts of water. The temperature of the resulting mixture was maintained at 100–115° F. and within ½ to 1 hour's time the adhesive was ready for use for solid laminating. Upon drying, after application in the usual manner, the adhesive gives a waterproof bond.

In the commercial practice of the invention according to the foregoing examples it may be advantageous for the user of laminating adhesive to purchase a dry mixture of starch and/or dextrin plus resorcinol or other phenolic compound. If called for in the adhesive formulation one or more fillers may be present in this dry mixture such as clay, soybean hulls, unpasted starch, ground corncobs, corn hulls or wood flour. In addition, the customer will purchase separately his necessary requirements of caustic soda or other alkali, and formaldehyde or other aldehyde, which may be used. The customer may conveniently prepare his requirements of adhesive by simply slurrying the dry mixture into water, adding the required amount of alkali and heating this slurry so as to paste the starch. The mixture would then be cooled to the proper temperature and the formaldehyde added and the mixture allowed to stand for ½ to 1 hour until observation or simple tests show that it has the proper adhesiveness and is ready for use. It will be seen that the foregoing procedure is simple and that clear instructions can be prepared which may be readily followed by operators familiar with the preparation and use of ordinary starch adhesives.

The corrugating board manufacturer in like manner can purchase a prepared carrier starch which contains the proper amount of resorcinol or other phenolic compound. The corrugator would also purchase formaldehyde and alkali and the secondary starch. From these ingredients the corrugator may readily prepare a corrugating board adhesive using the procedure set forth in Examples 3 and 4 above. An even simpler formulation for certain corrugators is the one illustrated in Example 5 above. Here the corrugator buys a mixture of pregelatinized starch, resorcinol and unpasted starch. He slurries such a mixture in water, heats it to a temperature of 100–115° F. and adds the proper amounts of alkali and formaldehyde. After setting a short time, the adhesive is ready for use.

The invention may also be practiced according to still another preferred embodiment which offers its own advantages. In this embodiment all of the starch is slurried in water and then sufficient alkali is added to produce an incipient pasting. The starch is allowed to swell, without becoming completely gelatinized, until the viscosity of the slurry reaches a desired level. The amount of alkali used is carefully controlled. When the starch has swollen sufficiently to give the desired viscosity, the phenolic compound is added so as to arrest the swelling action. At this point all of the starch is sufficiently reactive so that when aldehyde is added, polymerization between starch, phenolic compound and aldehyde occurs and a waterproof adhesive is obtained. The aldehyde is added about ½ to 1 hour before the adhesive is to be used during which time the mixture ripens and becomes ready for use either as a solid board laminating adhesive or as a corrugated board adhesive.

The foregoing procedure offers these five primary advantages: First, the adhesive gives an excellent waterproof bond with as little as 5% resorcinol (based on the weight of the starch). Second, only one lot of starch is used. Third, no heating is required since the normal operating temperature (e.g. 100–110° F.) in pasteboard factories is sufficient. Fourth, all of the starch is swelled and available for the copolymerization. Fifth, a high solids paste can be obtained (e.g. up to 25% dry substance) by using thick-boiling starches instead of having to use dextrins.

The alkali requirements for proper swelling of the starch are dependent primarily upon temperature, time and alkali concentration. The temperature at which the treatment is carried out is fairly critical for any particular set of conditions. For example, the normal operating temperature in pasteboard factories is in the range of 100–110° F. At this temperature range, the preferred concentration of caustic soda required to swell the starch varies between 0.8 and 0.95% based on the weight of the water only. In this temperature range, lower concentrations of the caustic soda will not swell the starch rapidly enough and higher concentrations will completely paste it in a matter of minutes or so. Even within the temperature range of 100–110° F. a few degrees change in temperature will markedly change the time required for the swelling action. In general, lower concentrations of caustic soda and lower temperatures will require longer swelling times and, conversely, higher caustic concentrations and higher temperatures require shorter swelling time. If a low concentration of caustic soda is used and a time of over an hour is required to get substantial swelling, then a 28–30 second viscosity on a Bauer funnel is all that is necessary in the way of a swelling treatment. If a higher concentration of caustic soda is used so that the swelling occurs in the matter of 5–15 minutes, then a 70–85 second viscosity on a Bauer funnel gives better results. In either case when the resorcinol is added, the viscosity of the paste drops to about 20 seconds which is optimum for the use of the adhesive.

The three following examples will serve to illustrate this particular embodiment of the invention:

*Example 7*

5.0 parts of caustic soda dissolved in 50 parts of water was slowly added to a rapidly stirred slurry of 180 parts of starch in 550 parts of water at 110° F. After 4 hours the viscosity was 28 seconds on the Bauer funnel and 9 parts of resorcinol was added followed by 5 parts of formaldehyde. After ripening 1 hour, the adhesive was ready for use at a viscosity of 20 seconds.

*Example 8*

5.4 parts of caustic soda dissolved in 50 parts of water was added slowly to a rapidly stirred slurry of 180 parts of starch in 550 parts of water at 102–105° F. After 45 minutes the viscosity was 75 seconds in the Bauer funnel and 9 parts of resorcinol was added followed by 5 parts of formaldehyde. After ripening 1 hour the adhesive was ready for use at a viscosity of 20.8 seconds.

*Example 9*

5.2 parts of caustic soda dissolved in 50 parts of water was added slowly to a rapidly stirred slurry of 180 parts of starch in 550 parts of water at 110° F. After 5 minutes the viscosity had reached 85 seconds and 9 parts of resorcinol was added to stop the swelling. 5 parts of formaldehyde was added and the mixture matured for 1 hour after which it was ready for use at a viscosity of 20.2 seconds.

In commercial practice a standardized procedure can be established and suitable instructions prepared so that this embodiment of the invention in which all of the starch is preliminarily swelled may be readily practiced in the pasteboard factories by regular operators. Such instructions will involve the use of standardized concentrations of caustic soda and will require a minimum in the way of temperature, time and viscosity readings. In the usual case, with a brief amount of experience, such preparations will become standardized and routine.

While for economic reasons caustic soda or sodium hydroxide will ordinarily be used as the alkali, other alkalies could be used such as potassium hydroxide.

Since certain further and additional embodiments of the invention may be made by those skilled in the art without departing from the spirit and scope of the invention, all matter described above is intended to be interpreted as illustrative and not in a limiting sense.

What is claimed as new is:

1. The method of preparing a dextrin base adhesive which comprises preparing a slurry of about 60 parts by weight of dextrin and about 6 parts of resorcinol in about 160 parts of water, adjusting the pH of the slurry to about 8.5 with sodium hydroxide, heating the slurry at a temperature of about 185–212° F. for about 10 minutes and then cooling it to a temperature of about 100–115° F., adding about 3 parts of paraformaldehyde in about 20 parts of water, and allowing the resulting mixture to ripen for about ½ to 1 hour.

2. The method of preparing a starch base adhesive which comprises preparing a slurry of about 60 parts by weight of Pearl starch and about 12 parts of resorcinol in 650 parts of water, adjusting the pH of the slurry to about 10 with sodium hydroxide, heating the slurry to a temperature of about 145–160° F. for approximately 10 minutes, cooling the slurry to a temperature of about 100–115° F., adding about 6.5 parts of paraformaldehyde, and allowing the resulting mixture to stand at a temperature of about 100–115° F. for ½ to 1 hour.

3. The method of preparing a starch base adhesive which comprises preparing a slurry of about 100 parts by weight of Pearl starch and about 45 parts of resorcinol in 600 parts of water, adjusting the pH of the slurry to about 10 with sodium hydroxide, heating the slurry to a temperature of about 145–160° F. for about 10 minutes, adding approximately 400 parts of water to the heated slurry, combining the heated slurry with a slurry containing approximately 500 parts by weight of Pearl starch and 25 parts of paraformaldehyde in 1045 parts of water, adjusting the temperature of the resulting mixture to about 100–115° F., and holding the resulting mixture at this temperature for approximately ½ to 1 hour.

4. The method of preparing a starch base adhesive which comprises preparing a slurry of about 100 parts by weight of Pearl starch and about 30 parts of resorcinol in 600 parts of water, adjusting the pH of the slurry to about 10 with sodium hydroxide, heating the slurry to a temperature of about 145–160° F. for about 10 minutes, adding approximately 400 parts of water to the heated slurry, combining the heated slurry with a slurry containing approximately 500 parts by weight of Pearl starch and 12 parts of paraformaldehyde in 1045 parts of water, adjusting the temperature of the resulting mixture to about 100–115° F., and holding the resulting mixture at this temperature for approximately ½ to 1 hour.

5. In the method of preparing a paperboard adhesive of satisfactory pot life which on curing form bonds ranging from water-resistant to waterproof which comprises reacting a phenol, an amylaceous material and an aldehyde, the improvement which comprises forming an aqueous mixture of at least one amylaceous material selected from the group consisting of starch and dextrin, at least one phenolic compound selected from the group consisting of phenol, hydroquinone, resorcinol, pyrocatechol, pyrogallol, and bisphenol in a concentration of from 2.5 to 20% by weight of said amylaceous material, and alkali sufficient to give a pH of at least 8.5, heating said mixture in the absence of an aldehyde at a temperature of from about 145° F. to about 212° F. to paste said amylaceous material, cooling said aqueous mixture to a temperature in the range of about 100–115° F., intimately mixing into said cooled mixture at least one aldehyde selected from the group consisting of formaldehyde, furfural, acetaldehyde, propionaldehyde and glyoxal, the aldehyde to phenolic ratio being from 1.3 to 2 mols of aldehyde compound to 1 mol of phenolic compound, and holding said mixture in said temperature range until said mixture on drying forms an adhesive bond ranging from water-resistant to waterproof.

6. The method of claim 5 in which ungelatinized amylaceous material and said aldehyde are added to said aqueous mixture after it has cooled.

References Cited in the file of this patent
UNITED STATES PATENTS

| | | |
|---|---|---|
| 2,529,851 | Scrutchfield | Nov. 14, 1950 |
| 2,626,934 | Kesler | Jan. 7, 1953 |
| 2,650,205 | Kesler et al. | Aug. 23, 1953 |